(12) United States Patent
Asai et al.

(10) Patent No.: US 10,767,001 B2
(45) Date of Patent: Sep. 8, 2020

(54) EPOXY RESIN CURING AGENT, EPOXY RESIN COMPOSITION, AND CARBON FIBER-REINFORCED COMPOSITE MATERIAL

(71) Applicant: MITSUBISHI GAS CHEMICAL COMPANY, INC., Tokyo (JP)

(72) Inventors: Yuiga Asai, Kanagawa (JP); Tomotaka Wada, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 27 days.

(21) Appl. No.: 16/090,884

(22) PCT Filed: Mar. 15, 2017

(86) PCT No.: PCT/JP2017/010410
§ 371 (c)(1),
(2) Date: Oct. 3, 2018

(87) PCT Pub. No.: WO2017/179358
PCT Pub. Date: Oct. 19, 2017

(65) Prior Publication Data
US 2019/0119435 A1 Apr. 25, 2019

(30) Foreign Application Priority Data

Apr. 12, 2016 (JP) .................. 2016-079548

(51) Int. Cl.
| | | |
|---|---|---|
| *C08G 59/56* | (2006.01) | |
| *C08G 59/50* | (2006.01) | |
| *C08G 59/62* | (2006.01) | |
| *C08J 5/24* | (2006.01) | |
| *B29C 39/18* | (2006.01) | |
| *C08K 7/06* | (2006.01) | |
| *C08J 5/04* | (2006.01) | |
| *B29C 70/28* | (2006.01) | |
| *C08G 59/24* | (2006.01) | |
| *C08J 5/00* | (2006.01) | |
| *B29K 63/00* | (2006.01) | |
| *B29K 105/00* | (2006.01) | |
| *B29K 307/04* | (2006.01) | |
| *B29L 31/30* | (2006.01) | |

(52) U.S. Cl.
CPC .............. *C08G 59/56* (2013.01); *B29C 39/18* (2013.01); *B29C 70/28* (2013.01); *C08G 59/245* (2013.01); *C08G 59/5026* (2013.01); *C08G 59/5033* (2013.01); *C08G 59/5073* (2013.01); *C08G 59/621* (2013.01); *C08J 5/005* (2013.01); *C08J 5/042* (2013.01); *C08J 5/24* (2013.01); *C08K 7/06* (2013.01); *B29K 2063/00* (2013.01); *B29K 2105/0005* (2013.01); *B29K 2307/04* (2013.01); *B29L 2031/30* (2013.01); *C08J 2363/02* (2013.01)

(58) Field of Classification Search
CPC ................ C08G 59/56; C08G 59/5026; C08G 59/5033; C08G 59/621; C08G 59/245; B29C 70/28; C08J 5/04
See application file for complete search history.

(56) References Cited

U.S. PATENT DOCUMENTS

| | | | |
|---|---|---|---|
| 2008/0161504 A1* | 7/2008 | Tobler ................... | C08G 18/12 525/403 |
| 2017/0158829 A1 | 7/2017 | Hondo et al. | |

FOREIGN PATENT DOCUMENTS

| | | |
|---|---|---|
| EP | 1731553 A1 | 12/2006 |
| EP | 1798249 A1 | 6/2007 |
| JP | 5-310890 A | 11/1993 |
| JP | 6-136099 A | 5/1994 |
| JP | 2001-163955 A | 6/2001 |
| JP | 2004-018711 A | 1/2004 |
| JP | 2007-56152 A | 3/2007 |
| JP | 2011-6499 A | 1/2011 |
| JP | 2011-163955 A | 8/2011 |
| JP | 2015-93948 A | 5/2015 |
| WO | 2016-017371 | 2/2016 |

OTHER PUBLICATIONS

Sadahiro Inoue, "Effects of Curing Accelerators on Cure of an Epoxy Resin and on Properties of Ingredients", Hokkaido Building Research Institute, Sapporo, 1977, pp. 969-975, vol. 26, Issue 289.
International Search Report in International Patent Application No. PCT/JP2017/010410, dated May 9, 2017.
International Preliminary Report on Patentability in International Patent Application No. PCT/JP2017//010410, dated Oct. 16, 2018.

* cited by examiner

*Primary Examiner* — Kuo Liang Peng
(74) *Attorney, Agent, or Firm* — Greenblum & Bernstein, P.L.C.

(57) ABSTRACT

Provided are: an epoxy resin curing agent containing an amine compound (A) represented by the following general formula (1) and a phenol compound (B), wherein the content of the component (B) is 8 to 35 parts by mass relative to 100 parts by mass of the component (A), an epoxy resin composition containing it, and a carbon fiber-reinforced composite material containing a cured product of the epoxy resin composition and carbon fibers. $R^1HN-H_2C-A-CH_2-NHR^2$ (1) wherein $R^1$ and $R^2$ each independently represent a hydrogen atom, or an aminoalkyl group having 1 to 6 carbon atoms, and A represents a cyclohexylene group or a phenylene group.

16 Claims, No Drawings

EPOXY RESIN CURING AGENT, EPOXY RESIN COMPOSITION, AND CARBON FIBER-REINFORCED COMPOSITE MATERIAL

TECHNICAL FIELD

The present invention relates to an epoxy resin curing agent, an epoxy resin composition containing the epoxy resin curing agent and an epoxy resin, and a carbon fiber-reinforced composite material containing a cured product of the epoxy resin composition and carbon fibers.

BACKGROUND ART

A carbon fiber-reinforced composite material (hereinafter also referred to as CFRP (carbon fiber-reinforced plastics)) has an extremely high elastic modulus and strength and is lightweight, and is therefore specifically noted as a metal-substitute material. Accelerated demand for CFRP especially for use for structure materials for an automobile, wind power blades, pressure vessels and aerospace systems is expected, and demand for carbon fibers as well as matrix resins such as epoxy resins for use for CFRP is increasing these days.

In use for structure materials for an automobile, wind power blades, pressure vessels and aerospace systems, CFRP molding methods differ, and therefore the necessary properties of matrix resins for CFRP also differ in such different uses.

For example, wind power blades have become molded through infusion molding, Va-RTM (vacuum assisted resin transfer molding) or Light-RTM. According to these methods, for example, reinforcing fibers are previously arranged in a mold composed of an upper die and a lower die using a film and FRP, and the mold is vacuumed so that an epoxy resin composition to be a matrix resin is filled therein and infiltrated into the reinforcing resins, and then the epoxy resin is cured and molded.

According to infusion molding, Va-RTM or Light-RTM, in general, it takes several tens of minutes before an epoxy resin composition prepared by mixing an epoxy resin and an epoxy resin curing agent could be filled in a mold owing to the characteristic of the molding method. Consequently, the epoxy resin composition to be used in the molding method is required to have a low viscosity and a long pot life. As the epoxy resin curing agent, an isophoronediamine, polyether skeleton-having polyamine compound or the like is used.

For CFRP for pressure vessels, molding according to a filament winding method is employed. A filament winding method is a method where reinforcing fiber yarns infiltrated with a matrix resin such as an epoxy resin composition are used to cover the outer surface of a liner and the matrix resin is cured. Regarding the epoxy resin composition to be used in this method, when the pot life thereof is short and the composition cures rapidly, the epoxy resin may cure in the stage before molding. Accordingly, a rapid-curing epoxy resin composition cannot be used in the filament winding method.

As opposed to this, CFRP for structure materials for an automobile is molded according to high-cycle RTM. This is an improvement of a conventional RTM method.

The conventional RTM method is a type of closed molding that uses a mold formed of a pair of upper and lower dies, in which a fiber-reinforced preform is arranged in the mold, then the mold is sealed up by clamping, and thereafter a resin such as an epoxy resin composition is injected into the mold via an injection hole so as to be infiltrated into the fiber-reinforced preform, and then the resin is cured and released from the mold. However, according to the conventional RTM method, the molding times takes a few hours (for preform arrangement, resin infiltration, resin curing and mold releasing), and therefore for production of CFRP for structure materials for an automobile, a high-cycle RTM method having higher productivity is employed.

Regarding the molding technology according to the high-cycle RTM method, the fiber-reinforced preform arrangement time, the resin infiltration time, the resin curing time and the mold releasing time are greatly shortened, and therefore the total molding time is shortened to 10 minutes or so. In the step from resin infiltration to curing in the high-cycle RTM method, for example, in a high-pressure RTM method that is a type of high-cycle RTM method, reinforcing fibers are arranged in a mold composed of a pair of upper and lower dies and sealed up therein, and the mold is depressurized. Next, an epoxy resin that is the main component of an epoxy resin composition, and an epoxy resin curing agent are pressed into the mixing head in a mist state from separate tanks, and immediately after collision mixing in the head, the resultant mixture is rapidly injected into the mold and infiltrated into the carbon fibers, and the epoxy resin is then cured. After collision mixing, the epoxy resin composition is injected into the mold under high pressure through plural injection nozzles so as to increase the filling speed in the mold and increase the infiltration speed into the carbon fibers.

In the high-cycle RTM method, an epoxy resin and an epoxy resin curing agent are mixed and then immediately injected into the mold, and therefore the pot life of the epoxy resin composition that is a mixture of the epoxy resin and the epoxy resin curing agent is not so much required to be long. On the other hand, however, from the viewpoint of productivity, the infiltration performance into reinforcing fibers and the filling speed into a mold are required to be high, and additionally the curability is required to be high, and therefore, the epoxy resin composition for use in the high-cycle RTM method is required to have a low viscosity and rapid curability.

It is known to use a polyamine compound as an epoxy resin curing gent, and PTLs 1 to 3 disclose an epoxy resin curing agent containing bis(aminomethyl)cyclohexane as a polyamine compound.

CITATION LIST

Patent Literature

PTL 1: JP-2001-163955A
PTL 2: JP-2011-6499A
PTL 3: JP-2015-93948A

SUMMARY OF INVENTION

Technical Problem

However, the epoxy resin curing agent, and the epoxy resin composition containing the curing agent and an epoxy resin for use for molding such as high-cycle RTM are desired to have more rapid curability and a lower viscosity.

The technical theme of the present invention is to provide an epoxy resin curing agent and an epoxy resin composition having rapid curability and a low viscosity and favorably usable in molding such as high-cycle RTM, and to provide a carbon fiber-reinforced composite material containing a cured product of the epoxy resin composition and carbon fibers.

Solution to Problem

For solving the above-mentioned problems, the present inventors have assiduously studied and, as a result, have found that an epoxy resin curing agent containing an amine compound having a specific structure and a predetermined amount of a phenol compound can solve the above-mentioned problems.

Specifically, the present invention relates to the following [1] to [13].

[1] An epoxy resin curing agent containing an amine compound (A) represented by the following general formula (1) and a phenol compound (B), wherein the content of the component (B) is from 8 to 35 parts by mass relative to 100 parts by mass of the component (A):

$$R^1HN—H_2C-A-CH_2—NHR^2 \quad (1)$$

wherein $R^1$ and $R^2$ each independently represent a hydrogen atom, or an aminoalkyl group having 1 to 6 carbon atoms, and A represents a cyclohexylene group or a phenylene group.

[2] The epoxy resin curing agent according to the above [1], wherein $R^1$ and $R^2$ in the general formula (1) are both hydrogen atoms.

[3] The epoxy resin curing agent according to the above [1] or [2], wherein A in the general formula (1) is a cyclohexylene group.

[4] The epoxy resin curing agent according to any one of the above [1] to [3], wherein the phenol compound (B) is a compound represented by the following general formula (2):

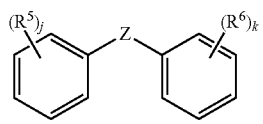

wherein $R^5$ and $R^6$ each independently represent an OH group or an alkyl group having 1 to 4 carbon atoms; j and k each independently represent an integer of 0 to 5, provided that j+k is 1 or more; plural $R^5$'s, if any, may be all the same as or different from each other, plural $R^6$'s, if any, may be all the same as or different from each other, provided that at least one OH group is present as $R^5$ or $R^6$; and Z represents a single bond, an alkylene group having 1 to 6 carbon atoms, an alkylidene group having 2 to 6 carbon atoms, a cycloalkylene group having 5 to 10 carbon atoms, a cycloalkylidene group having 5 to 10 carbon atoms, an arylalkylene group having 7 to 15 carbon atoms, an arylalkylidene group having 7 to 15 carbon atoms, —S—, —SO—, —SO$_2$—, —O—, —CO—, —C(CF$_3$)$_2$—, —CH(CF$_3$)—, —CF$_2$—, —CONH—, or —COO—.

[5] The epoxy resin curing agent according to the above [4], wherein the phenol compound (B) is at least one selected from the group consisting of 4,4'-(propane-2,2-diyl)diphenol, bis(4-hydroxyphenyl)methane, 1,1-bis(4-hydroxyphenyl)ethane, and styrenated phenol.

[6] An epoxy resin composition containing the epoxy resin curing agent of any one of the above [1] to [5], and an epoxy resin.

[7] The epoxy resin composition according to the above [6], wherein the epoxy resin is an epoxy resin containing an aromatic ring or an alicyclic structure in the molecule.

[8] The epoxy resin composition according to the above [7], wherein the epoxy resin is an epoxy resin represented by the following general formula (3):

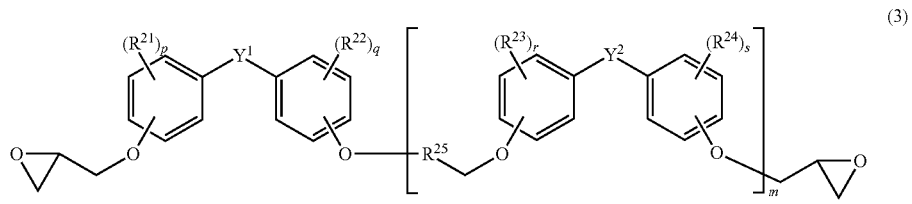

wherein $R^{21}$ to $R^{24}$ each independently represent an alkyl group having 1 to 6 carbon atoms, p, q, r and s each independently represent an integer of 0 to 4, with respect to each of $R^{21}$, $R^{22}$, $R^{23}$, and $R^{24}$, plural groups, if any, may be all the same as or different from each other, $Y^1$ and $Y^2$ each independently represent a single bond, —CH$_2$—, —CH(CH$_3$)—, or —C(CH$_3$)$_2$—, $R^{25}$ represents —CH$_2$CH(OH)—, or —CH(OH)CH$_2$—, and m represents a mean repeating unit number and is a number of 0 to 0.2.

[9] The epoxy resin composition according to any one of the above [6] to [8], which has a viscosity at a temperature 40° C. of 400 mPa·s or less.

[10] The epoxy resin composition according to any one of the above [6] to [9], which is for a carbon fiber-reinforced composite material.

[11] A carbon fiber-reinforced composite material containing a cured product of the epoxy resin composition of any one of the above [6] to [10], and carbon fibers.

[12] The carbon fiber-reinforced composite material according to the above [11], which is a structure material for an automobile.

[13] A method for producing the carbon fiber-reinforced composite material of the above [11] or [12], including a step of performing molding according to a low-pressure RTM method, a middle-pressure RTM method, a high-pressure RTM method, a compression RTM method, a liquid compression molding method, a liquid lay-down molding method, a spray lay-down molding method, a surface RTM method, a prepreg compression molding method, or a liquid cast molding method.

Advantageous Effects of Invention

According to the present invention, there can be provided an epoxy resin curing agent and an epoxy resin composition having rapid curability and having a low viscosity, which can produce CFRP such as structure materials for an automobile and building materials at good productivity according to a high-cycle RTM method or the like. When the epoxy resin composition is used as a matrix resin for CFRP, the time before release from mold can be shortened and CFRP productivity can be improved since the composition is excellent in infiltration performance and has rapid curability.

DESCRIPTION OF EMBODIMENTS

[Epoxy Resin Curing Agent]

The epoxy resin curing agent of the present invention is an epoxy resin curing agent containing an amine compound (A) represented by the following general formula (1) and a phenol compound (B), wherein the content of the component (B) is 8 to 35 parts by mass relative to 100 parts by mass of the component (A):

$$R^1HN-H_2C-A-CH_2-NHR^2 \quad (1)$$

wherein $R^1$ and $R^2$ each independently represent a hydrogen atom, or an aminoalkyl group having 1 to 6 carbon atoms, and A represents a cyclohexylene group or a phenylene group.

(Amine Compound (A))

The amine compound (A) is a compound represented by the above-mentioned general formula (1). The epoxy resin curing agent of the present invention contains the amine compound (A) having a specific structure, and therefore the epoxy resin curing agent and the epoxy resin composition containing the curing agent can have a low viscosity and rapid curability.

In the formula (1), $R^1$ and $R^2$ each independently represent a hydrogen atom, or an aminoalkyl group having 1 to 6 carbon atoms. It is preferable that $R^1$ and $R^2$ each independently represent a hydrogen atom, or an aminoalkyl group having 1 to 4 carbon atoms, it is more preferable that $R^1$ and $R^2$ each independently represent a hydrogen atom or an aminoalkyl group having 2 to 4 carbon atoms, and it is even more preferable that $R^1$ and $R^2$ are both hydrogen atoms.

In the formula (1), A represents a cyclohexylene group or a phenylene group, and is preferably a cyclohexylene group. Specifically, A is one or more selected from the group consisting of a 1,2-cyclohexylene group, a 1,3-cyclohexylene group, a 1,4-cyclohexylene group, a 1,2-phenylene group, a 1,3-phenylene group and a 1,4-phenylene group, and from the viewpoint of heat resistance and weather resistance, A is preferably one or more selected from the group consisting of a 1,2-cyclohexylene group, a 1,3-cyclohexylene group and a 1,4-cyclohexylene group, and more preferably a 1,3-cyclohexylene group. In this description, the cyclohexylene group includes both a cis-form and a trans-form.

Specific examples of the amine compound (A) include 1,2-bis(aminomethyl)cyclohexane, 1,3-bis(aminomethyl)cyclohexane, 1,4-bis(aminomethyl)cyclohexane, o-xylylenediamine, m-xylylenediamine (MXDA), p-xylylenediamine (PXDA), and compounds represented by the following general formulae (1-1) to (1-4).

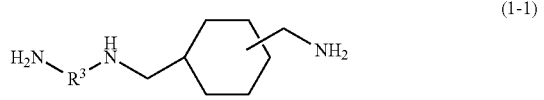

(1-1)

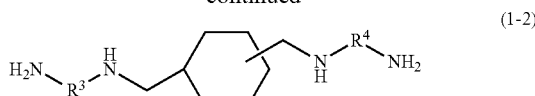

(1-2)

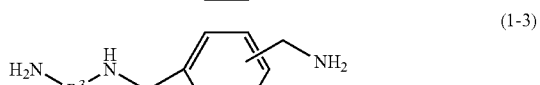

(1-3)

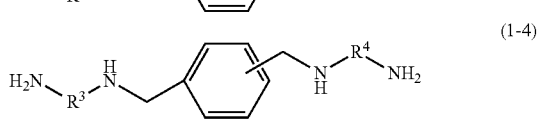

(1-4)

In the formulae (1-1) to (1-4), $R^3$ and $R^4$ each independently represent an alkylene group having 1 to 6 carbon atoms. $R^3$ and $R^4$ each independently preferably represent an alkylene group having 1 to 4 carbon atoms, more preferably represent an alkylene group having 2 to 4 carbon atoms, and even more preferably represent an alkylene group having 3 carbon atoms.

Among the above, the amine compound (A) is preferably one or more selected from the group consisting of 1,2-bis(aminomethyl)cyclohexane, 1,3-bis(aminomethyl)cyclohexane, 1,4-bis(aminomethyl)cyclohexane, o-xylylenediamine, m-xylylenediamine (MXDA), p-xylylenediamine (PXDA), compounds represented by the general formula (1-1), and compound represented by the general formula (1-2), more preferably one or more selected from the group consisting of 1,2-bis(aminomethyl)cyclohexane, 1,3-bis(aminomethyl)cyclohexane, 1,4-bis(aminomethyl)cyclohexane, o-xylylenediamine, m-xylylenediamine, and p-xylylenediamine, and from the viewpoint of heat resistance and weather resistance, even more preferably one or more selected from the group consisting of 1,2-bis(aminomethyl)cyclohexane, 1,3-bis(aminomethyl)cyclohexane, and 1,4-bis(aminomethyl)cyclohexane, and further more preferably 1,3-bis(aminomethyl)cyclohexane. As the amine compound (A), one kind thereof may be used singly, or two or more thereof may be used in combination.

(Phenol Compound (B))

The epoxy resin curing agent of the present invention contains a predetermined amount of a phenol compound (B). Accordingly, the present invention provides an epoxy resin curing agent and an epoxy resin composition satisfying both low viscosity and rapid curability.

Even though alone, the component (A) may function as an epoxy resin curing agent, but a phenol compound (B) acts as a curing accelerator for the component (A), and therefore by blending a phenol compound (B), an epoxy resin curing agent having more rapid curability can be provided. The reason may be considered to be because, owing to the proton derived from the phenolic hydroxy group that the component (B) has, the epoxy group of the epoxy resin may undergo electron deficiency with the result that the electrophilicity of the epoxy group relative to the amino group may be thereby increased.

Accordingly, for the phenol compound (B) any compound having at least one phenolic hydroxy group in the molecule may be used with no specific limitation. From the viewpoint that the compound can exhibit the effect even though the amount thereof is small and from the viewpoint of the miscibility of the compound with the amine compound (A) and the epoxy resin to be mentioned hereinunder, a phenol compound having a molecular weight of less than 1,000 is preferred, and a compound represented by the following general formula (2) is more preferred.

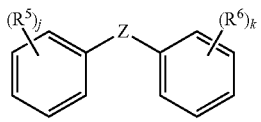

(2)

In the formula (2), $R^5$ and $R^6$ each independently represent an OH group or an alkyl group having 1 to 4 carbon atoms; j and k each independently represent an integer of 0 to 5, provided that j+k is 1 or more; plural $R^5$'s, if any, may be all the same as or different from each other, plural $R^6$'s, if any, may be all the same as or different from each other, provided that at least one OH group is present as $R^5$ or $R^6$; and Z represents a single bond, an alkylene group having 1 to 6 carbon atoms, an alkylidene group having 2 to 6 carbon atoms, a cycloalkylene group having 5 to 10 carbon atoms, a cycloalkylidene group having 5 to 10 carbon atoms, an arylalkylene group having 7 to 15 carbon atoms, an arylalkylidene group having 7 to 15 carbon atoms, —S—, —SO—, —SO$_2$—, —O—, —CO—, —C(CF$_3$)$_2$—, —CH (CF$_3$)—, —CF$_2$—, —CONH—, or —COO—.

In the formula (2), preferably, $R^5$ and $R^6$ each are an OH group, and also preferably, j and k each are independently an integer of 0 to 2, and j+k is 1 to 3.

In the formula (2), examples of the alkylene group having 1 to 6 carbon atoms for Z include a methylene group, an ethylene group, a trimethylene group, a tetramethylene group and a hexamethylene group, with an alkylene group having 1 to 3 carbon atoms being preferred. Examples of the alkylidene group having 2 to 6 carbon atoms include an ethylidene group (—CH(CH$_3$)—), and a propylidene group (—C(CH$_3$)$_2$—), with an alkylidene group having 2 to 3 carbon atoms being preferred.

Examples of the cycloalkylene group having 5 to 10 carbon atoms include a cyclopentanediyl group, a cyclohexanediyl group, and a cyclooctanediyl group. Examples of the cycloalkylidene group having 5 to 10 carbon atoms include a cyclohexylidene group, and a 3,5,5-trimethylcyclohexylidene group. Examples of the aryl moiety in the arylalkylene group having 7 to 15 carbon atoms and the arylalkylidene group having 7 to 15 carbon atoms include an aryl group having 6 to 14 ring carbon atoms such as a phenyl group, a naphthyl group, a biphenyl group, and an anthryl group.

Among the above, Z is preferably at least one selected from the group consisting of a single bond, an alkylene group having 1 to 3 carbon atoms and an alkylidene group having 2 to 3 carbon atoms, more preferably a single bond, a methylene group, an ethylidene group or a propylidene group, and even more preferably a methylene group, an ethylidene group or a propylidene group.

Specific examples of the compound represented by the general formula (2) include bisphenol A [4,4'-(propane-2,2-diyl)diphenol], bisphenol F [bis(4-hydroxyphenyl) methane], bisphenol AP [1,1-bis(4-hydroxyphenyl)-1-phenylethane], bisphenol AF [2,2-bis(4-hydroxyphenyl) hexafluoropropane], bisphenol B [2,2-bis(4-hydroxyphenyl) butane], bisphenol BP [bis(4-hydroxyphenyl) diphenylmethane], bisphenol S [bis(4-hydroxyphenyl) sulfone], bisphenol E [1,1-bis(4-hydroxyphenyl)ethane], styrenated phenol, hydroxybiphenyl, and dihydroxybiphenyl. Among these, from the viewpoint of the solubility thereof in a curing agent, at least one selected from the group consisting of bisphenol A [4,4'-(propane-2,2-diyl)diphenyl], bisphenol F [bis(4-hydroxyphenyl)methane], bisphenol E [1,1-bis(4-hydroxyphenyl)ethane], and styrenated phenol is preferred, and from the viewpoint of the ability thereof to express the effect even though the amount is small, at least one selected from the group consisting of bisphenol A [4,4'-(propane-2,2-diyl)diphenol], bisphenol F [bis(4-hydroxyphenyl)methane], and bisphenol E [1,1-bis(4-hydroxyphenyl)ethane] is more preferred.

The styrenated phenol is preferably a 1/1 adduct of styrene and phenol, namely, a compound represented by the following formula (2-1). Preferably, the styrenated phenol contains the compound represented by the following formula (2-1) as the main ingredient thereof, but may also contain a polyadduct such as a 2/1 adduct of styrene and phenol, and a 3/1 adduct of styrene and phenol. In this description, the "main ingredient" means an ingredient whose content is 50% by mass or more relative to the entire constituent components of 100% by mass, preferably 70% by mass or more, and even more preferably 80% by mass or more (the upper limit is 100% by mass). Commercially-available styrenated phenols include "Kumanox-3110", "Kumanox-3111", "Kumanox-3114", "Kumanox-3120", and "Kumanox-SP" by Kumho Petrochemical Co., Ltd.

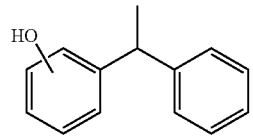

(2-1)

Examples of the other compound usable as the component (B) than the compound represented by the general formula (2) include phenol, cresol, hydroquinone, 1-naphthol, 2-naphthol, resorcinol, phenol-novolak resin, p-isopropylphenol, p-tert-butylphenol, and nonylphenol.

As the phenol compound (B), one kind thereof may be used singly or two or more thereof may be used in combination.

The content of the phenol compound (B) in the epoxy resin curing agent is 8 to 35 parts by mass relative to 100 parts by mass of the component (A). When the content of the component (B) relative to 100 parts by mass of the component (A) is less than 8 parts by mass, rapid curability could not be attained. When the content is more than 35 parts by mass, the epoxy resin curing agent and the epoxy resin composition containing it may have a high viscosity, thereby lowering the moldability and the productivity, especially when the agent or the composition is used in CFRP to be molded through high-cycle RTM. Furthermore, the mechanical strength and the heat resistance of the resultant CFRP may lower. From these viewpoints, the content of the phenol compound (B) in the epoxy resin curing agent is preferably 10 parts by mass or more, more preferably 15 parts by mass or more, and is preferably 30 parts by mass or less, more preferably 25 parts by mass or less, relative to 100 parts by mass of the component (A).

The epoxy resin curing agent of the present invention may contain any other known curing agent than the component (A), any other known curing accelerator than the component (B), and any known additive and solvent. Examples of the other curing agent than the component (A) include a polyamine compound having 2 or more amino groups in the molecule than the component (A), and a modified derivative thereof. Examples of the polyamine compound include a chain aliphatic polyamine compound such as ethylenediamine, diethylenetriamine, triethylenetetramine, tetraethylenepentamine, pentaethylenehexamine, hexamethylenediamine, 2-methylpentamethylenediamine, and trimethylhexamethylenediamine; a polyamine compound having an alicyclic structure such as menthenediamine, isophoronediamine, norbornanediamine, tricyclodecanediamine, adamantanediamine, diaminocyclohexane, 1,4-diamino-2-methylcyclohexane, 1,4-diamino-3,6-diethylcyclohexane, diaminodiethylmethylcyclohexane, 3,3'-dimethyl-4,4'-diaminodicyclohexylmethane, and 4,4'-diaminodicyclohexylmethane; an aromatic polyamine compound such as phenylenediamine, diaminodiphenylmethane, and diaminodiphenyl sulfone; a polyamine compound having a heterocyclic structure such as N-aminomethylpiperazine, and N-aminoethylpiperazine; a polyether polyamine compound, and a Mannich modified derivative, an epoxy modified derivative, a Michael adduct, a Michael adduct polycondensate, a styrene modified derivative, and a polyamide modified derivative thereof. One alone of these may be used singly, or two or more of these may be used in combination. For example, N-aminoethylpiperazine is preferably added as the other polyamine compound than the component (A) since the compound can accelerate the curing speed and can toughen the resultant epoxy resin composition.

However, from the viewpoint of efficiently expressing the advantageous effect of the present invention, the total content of the amine compound (A) and the phenol compound (B) is so controlled as to be preferably 50% by mass or more, more preferably 70% by mass or more, still more preferably 80% by mass or more, even more preferably 85% by mass or more, further more preferably 95% by mass or more, and especially more preferably 99% by mass or more (the upper limit is 100% by mass) relative to the total amount of the epoxy resin curing agent of the present invention.

The viscosity at a temperature 25° C. of the epoxy resin curing agent of the present invention is preferably 150 mPa·s or less, more preferably 100 mPa·s or less, and even more preferably 60 mPa·s or less. When the viscosity at a temperature 25° C. is 150 mPa·s or less, the curing agent can be readily mixed with an epoxy resin and, when used in CFRP, the productivity is improved. The lower limit of the viscosity at a temperature 25° C. of the epoxy resin curing agent is not specifically limited, but is, from the viewpoint of miscibility with an epoxy resin, preferably 10 mPa·s or more.

[Epoxy Resin Composition]

The epoxy resin composition of the present invention contains the epoxy resin curing agent of the present invention and an epoxy resin. Any epoxy resin may be used as long as the epoxy resin has a glycidyl group capable of reacting with the active amine hydrogen in the epoxy resin curing agent of the present invention, but the epoxy resin is, from the viewpoint of excellent mechanical strength of the cured product of the composition, preferably an epoxy resin having an aromatic ring or an alicyclic structure in the molecule, more preferably at least one selected from the group consisting of a bisphenol A-type epoxy resin and a bisphenol F-type epoxy resin, and even more preferably a bisphenol A-type epoxy resin. Above all, from the viewpoint of securing low viscosity and mechanical strength of the cured product, an epoxy resin represented by the following general formula (3) is especially preferred.

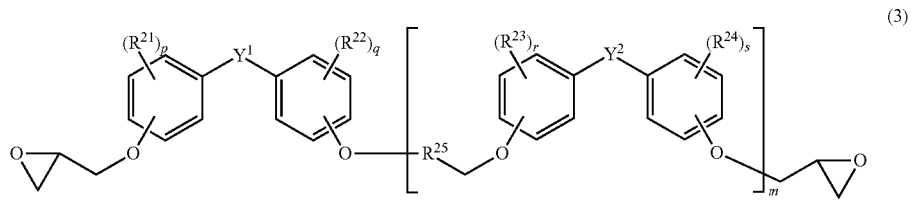

(3)

In the formula (3), $R^{21}$ to $R^{24}$ each independently represent an alkyl group having 1 to 6 carbon atoms; p, q, r and s each independently represent an integer of 0 to 4, with respect to each of $R^{21}$, $R^{22}$, $R^{23}$, and $R^{24}$, plural groups, if any, may be all the same as or different from each other; $Y^1$ and $Y^2$ each independently represent a single bond, —$CH_2$—, —$CH(CH_3)$—, or —$C(CH_3)_2$—; $R^{25}$ represents —$CH_2CH(OH)$—, or —$CH(OH)CH_2$—; and m represents a mean repeating unit number and is a number of 0 to 0.2.

$R^{21}$ to $R^{24}$ each are preferably an alkyl group having 1 to 4 carbon atoms, and more preferably at least one selected from the group consisting of a methyl group, an ethyl group, an isopropyl group, and a t-butyl group.

p, q, r and s each are preferably an integer of 0 to 2, more preferably 0 or 1, and even more preferably all 0.

$Y^1$ and $Y^2$ each are preferably —$CH_2$—, or —$C(CH_3)_2$—, and more preferably —$C(CH_3)_2$—.

From the viewpoint of securing low viscosity and mechanical strength of the cured product, m is preferably 0 to 0.15, and more preferably 0.01 to 0.1.

The epoxy equivalent of the epoxy resin is, from the viewpoint of satisfying both low viscosity and rapid curability of the epoxy resin composition, preferably 300 g/equivalent or less, more preferably 220 g/equivalent or less, even more preferably 200 g/equivalent or less, and further more preferably 180 g/equivalent or less.

One kind of an epoxy resin may be used singly, or two or more thereof may be used in combination.

The epoxy resin composition of the present invention may further contain a modifying component such as a filler and a plasticizer, a flowability controlling component such as a thixotropic agent, and any other components such as a pigment, a leveling agent, a tackifier, and elastomer fine particles, depending on the use thereof.

Regarding the content of the epoxy resin curing agent in the epoxy resin composition of the present invention, the ratio of the number of active amine hydrogens in the epoxy resin curing agent to the number of the epoxy groups in the epoxy resin (number of active amine hydrogens in epoxy resin curing agent/number of epoxy groups in epoxy resin) is preferably 1/0.8 to 1/1.2, more preferably 1/0.9 to 1/1.1, and even more preferably 1/1.

The viscosity at a temperature 40° C. of the epoxy resin composition of the present invention is preferably 400 mPa·s or less, more preferably 350 mPa·s or less, and even more preferably 300 mPa·s or less. When the viscosity at a temperature 40° C. is 400 mPa·s or less, the productivity increases when the composition is used in CFRP. The lower limit of the viscosity at a temperature 40° C. of the epoxy resin composition is not specifically limited, but is, from the viewpoint of preventing turbulence of carbon fibers owing to occurrence of turbulence flow in a mold through increase in the Reynolds number in molding of CFRP, preferably 150 mPa·s or more.

The gelling time at a temperature 80° C. of the epoxy resin composition of the present invention is, from the viewpoint of rapid curability, preferably 10 minutes or less, more preferably 8.0 minutes or less, even more preferably 7.0 minutes or less, and further more preferably 6.0 minutes or less. From the viewpoint of operability, the gelling time is preferably 0.5 minutes or more, and more preferably 1.0 minute or more.

The gelling time may be measured according to the method described in the section of Examples, using a rheometer. Specifically, using a rheometer, the storage elastic modulus G' and the loss elastic modulus G" of the epoxy resin composition are measured at a temperature 80° C., a frequency 1 Hz and a plate-to-plate distance 0.5 mm, and the intersection of G' and G" is referred to as the gelling time.

A production method for the epoxy resin composition of the present invention is not specifically limited, and the composition may be produced by mixing an epoxy resin curing agent, an epoxy resin and optional other components according to a known method and using a known apparatus. The mixing order for the components to be contained in the epoxy resin composition is not also specifically limited. An amine compound (A) and a phenol compound (B) may be mixed to prepare an epoxy resin curing agent, and then an epoxy resin may be added thereto; or an amine compound (A) and a phenol compound (B) to be contained in the epoxy resin curing agent and an epoxy resin may be mixed all at a time.

Regarding the cured product of the epoxy resin composition of the present invention is, from the viewpoint of improving the productivity of molded products in use for the carbon fiber-reinforced composite material or the like to be mentioned below, the heat distortion temperature of the cured product is preferably high. When the heat distortion temperature of the cured product of the epoxy resin composition is high, a molded product may be released from a mold even when the mold is not cooled to a low temperature in use of the composition in carbon fiber-reinforced composite materials, and therefore the molding cycle can be shortened.

For example, the heat distortion temperature of a cured product having a size of 10 mm×80 mm×2 mm thick produced by curing the epoxy resin composition of the present invention at 120° C. for 120 minutes, as measured using a heat distortion temperature testing apparatus under the condition of an inter-fulcrum distance 64 mm, a load 1.8 MPa and a heating rate 120° C./hr, is preferably 100° C. or higher, more preferably 110° C. or higher, even more preferably 120° C. or higher, and further more preferably 123° C. or higher. The heat distortion temperature may be measured according to the method described in the section of Examples.

The epoxy resin curing agent and the epoxy resin composition containing it of the present invention are characterized by having rapid curability and a low viscosity, and are therefore favorably used for fiber-reinforced composite materials, especially for carbon fiber-reinforced composite materials.

A fiber-reinforced composite material (FRP) contains a cured product of the epoxy resin composition and a reinforcing fiber, and can be produced by infiltrating the epoxy resin composition into reinforcing fibers and curing the composition. FRP may further contain a foaming material in addition to the epoxy resin composition cured product and reinforcing fibers.

Examples of the reinforcing fiber include glass fibers, carbon fibers, boron fibers and metal fibers. One kind of the reinforcing fibers may be used singly, or two or more kinds thereof may be used in combination. Among these, from the viewpoint of strength and lightweight properties of the resultant composite materials, carbon fibers are preferred.

The foaming material is not specifically limited, and examples thereof include those formed of a resin material such as a polyvinyl chloride resin, a polyurethane resin, a polystyrene resin, a polyolefin resin, an acrylic resin, a phenolic resin, a polymethacrylimide resin, and an epoxy resin.

The carbon fiber-reinforced composite material containing a cured product of the epoxy resin composition and carbon fibers is described below.

[Carbon Fiber-Reinforced Composite Material (CFRP)]

The carbon fiber-reinforced composite material (CFRP) of the present invention contains a cured product of the epoxy resin composition and carbon fibers, and can be produced by infiltrating the epoxy resin composition into carbon fibers and curing the composition. CFRP may further contain any other reinforcing fibers than carbon fibers and the above-mentioned foaming material, in addition to the cured product of the epoxy resin composition and carbon fibers.

(Carbon Fibers)

The carbon fibers for use in CFRP of the present invention may be those produced using rayon or polyacrylonitrile (PAN) as a raw material, or may be those produced by spinning a raw material of petroleum or coal pitch. In addition, recycled products from mill ends of carbon fibers as well as recycled carbon fibers through resin removal from CFRP may also be used. Regarding the form of carbon fibers, examples thereof include those produced by simply aligning monofilaments or multifilaments in one direction or by alternately interlacing them, and other various forms of fabrics such as woven or knitted fabrics, nonwoven fabrics, and mats. Among these, forms of monofilaments, fabrics, nonwoven fabrics or mats are preferred, and a form of fabrics is more preferred.

The mean fiber diameter of the carbon fibers is preferably 1 to 100 μm, more preferably 3 to 50 μm, and even more preferably 4 to 20 μm. When the mean fiber diameter falls within the range, the fibers are easy to work, and the resultant CFRP may be excellent in elastic modulus and strength. The mean fiber diameter can be measured through observation with a scanning electron microscope (SEM). 50 or more fibers are randomly samples and the length thereof is measured, and the data are averaged to determine a number-averaged mean fiber diameter.

The fineness of the carbon fiber is preferably 20 to 4,500 tex, and more preferably 50 to 4,000 tex. When the fineness falls within the range, the epoxy resin composition can be readily infiltrated into the fibers, and the resultant composite material can be excellent in elastic modulus and strength. For determining the fineness, the weight of long fibers having an unprescribed length is measured, and the data are converted into the weight thereof per 1,000 m. Regarding the number of filaments, in general, carbon fibers of 500 to 60,000 filaments or so are preferably used.

[Production Method for Carbon Fiber-Reinforced Composite Material]

A production method for the carbon fiber-reinforced composite material of the present invention is not specifically limited, but the epoxy resin curing agent and the epoxy resin composition of the present invention are rapidly curable, and therefore, for producing the carbon fiber-reinforced composite material, it is preferable that the epoxy resin curing agent is mixed with an epoxy resin just before molding, and then, preferably within 10 minutes, more preferably within 5 minutes, the resultant mixture is infiltrated in carbon fibers and cured.

From this viewpoint, preferably, the production method for the carbon fiber-reinforced composite material of the present invention includes a step of performing molding according to a low-pressure RTM method, a middle-pressure RTM method, a high-pressure RTM method, a compression RTM method, a liquid compression molding method, a liquid lay-down molding method, a spray lay-down molding method, a surface RTM method, a prepreg compression molding method or a liquid cast molding method. Among these molding methods, a low-pressure RTM method, a middle-pressure RTM method, or a high-pressure RTM method is preferred from the viewpoint of applicability to a high-cycle RTM method; a middle-pressure RTM method or a high-pressure RTM method is more preferred; and from the viewpoint of molding speed, a high-pressure RTM method is even more preferred.

In this description, "low pressure" in the low-pressure RTM method means that the pressure in pressure feeding and mixing of the epoxy resin of a main ingredient of the epoxy resin composition and the epoxy resin curing agent is less than 0.5 MPa. Similarly, "middle pressure" in the middle-pressure RTM method means that the pressure is 0.5 MPa or more and less than 7 MPa, and "high pressure" in the high-pressure RTM method means that the pressure is 7 MPa or more and 20 MPa or less.

According to the above-mentioned molding method, the epoxy resin curing agent of the present invention can be mixed with an epoxy resin just before molding, and therefore the pot life of the epoxy resin composition is not required to be so long. In addition, the epoxy resin composition is rapidly curable and has a low viscosity, and therefore can be rapidly filled in a mold and infiltrated into carbon fibers and can rapidly cure therein, and accordingly, the molding time can be significantly shortened. Consequently, the epoxy resin curing agent and the epoxy resin composition of the present invention are especially favorable for the above-mentioned molding method. By applying the epoxy resin curing agent and the epoxy resin composition to the above-mentioned molding method, middle-scale to large-scale CFRP such as structure materials for an automobile and building materials can be produced at good productivity.

In a high-pressure RTM method, preferably, a collisional mixer is used as the apparatus for mixing an epoxy resin of the main ingredient of the epoxy resin composition and the epoxy resin curing agent. For example, carbon fibers are arranged in a mold composed of a pair of upper and lower dies and sealed up therein, and then the mold is depressurized. Next, an epoxy resin of the main ingredient of the epoxy resin composition, and the epoxy resin curing agent are filled in separate tanks, and are individually jetted out through extremely small orifices at a high speed to thereby make them collide against each other and mix together in the mixing chamber of a collisional mixer. The thus-prepared epoxy resin composition is injected into a mold under high pressure to be infiltrated into carbon fibers therein, and then the epoxy resin is cured.

In a low-pressure RTM method, preferably, a dynamic mixer is used as the apparatus for mixing an epoxy resin of the main ingredient of the epoxy resin composition and the epoxy resin curing agent. The dynamic mixer is provided with a cylindrical high-speed rotor having a roughened surface. For example, an epoxy resin of the main ingredient of the epoxy resin composition and the epoxy resin curing agent are filled in separate tanks, and are individually fed to the dynamic mixer, in which the two liquids of the main ingredient and the curing agents are mixed with the rotor. The thus-prepared epoxy resin composition is injected into a mold and infiltrated into carbon fibers therein, and then the epoxy resin is cured. The low-pressure RTM method is advantageous in the case where the blending ratio of the epoxy resin and the epoxy resin curing agent differs greatly and from the viewpoint of apparatus cost reduction and apparatus space reduction.

In a middle-pressure RTM method, preferably, a static mixer is used as the apparatus for mixing an epoxy resin of the main ingredient of the epoxy resin composition and the epoxy resin curing agent. The static mixer is a tubular reactor having, as incorporated therein, one or more static mixing units each composed of a large number of mixing elements. For example, an epoxy resin of the main ingredient of the epoxy resin composition and the epoxy resin curing agent are filled in separate tanks, and are individually fed to the static mixer. The two liquids of the main ingredient and the curing agents are introduced through the twisted elements of the static mixer and the two liquids are thus mixed owing to the action of division, conversion and inversion. The thus-prepared epoxy resin composition is injected into a mold and infiltrated into carbon fibers therein, and then the epoxy resin is cured. The middle-pressure RTM method is advantageous in that the epoxy resin composition can be fed into a mold under pressure and from the viewpoint of apparatus cost reduction.

In the case where CFRP further contains a foaming material in addition to the cured product of the epoxy resin composition and carbon fibers, carbon fibers and a foaming material may be arranged in a mold, and formed into CFRP therein in the same manner as above.

Also in a liquid compression molding (LCM) method and a liquid lay-down molding method, the epoxy resin curing agent and the epoxy resin composition of the present invention can be favorably used. In an LCM method and a liquid lay-down molding method, the epoxy resin composition is cast on carbon fibers (in the case where CFRP further contains a foaming material, on carbon fibers and a foaming material) and infiltrated thereinto, and then the epoxy resin is cured by compression under heat.

In molding of CFRP, the temperature at which the epoxy resin composition is injected into a mold or infiltrated into carbon fibers is preferably 30 to 120° C., and more preferably 50 to 100° C. In the case where the epoxy resin curing agent and an epoxy resin are fed from separate tanks and mixed just before molding, the temperature of the epoxy resin curing agent and the epoxy resin in mixing may be set individually. The temperature of the epoxy resin curing agent in mixing is, from the viewpoint of preventing viscosity increase, preferably 5 to 30° C., and more preferably 10 to 25° C. The temperature of the epoxy resin in mixing may be appropriately adjusted depending on the viscosity of the epoxy resin, and is preferably 30 to 120° C., and more preferably 50 to 100° C.

The time for infiltration of the epoxy resin composition into carbon fibers is, from the viewpoint of moldability and productivity, preferably 0.1 to 15 minutes, more preferably 0.2 to 10 minutes, and even more preferably 0.5 to 5 minutes.

The curing temperature of the epoxy resin composition is preferably 50 to 200° C., more preferably 80 to 150° C., and even more preferably 100 to 150° C. When the curing temperature is 50° C. or higher, the epoxy resin can sufficiently cure, and the resultant CFRP may have excellent mechanical properties. On the other hand, when the temperature is 200° C. or lower, the cost for mold temperature control may be low. The curing time for the epoxy resin composition is, from the viewpoint of moldability and productivity, preferably 0.1 to 15 minutes, more preferably 0.2 to 10 minutes, and even more preferably 0.5 to 5 minutes.

Using the epoxy resin curing agent and the epoxy resin composition of the present invention, CFRP may be produced at good productivity according to the above-mentioned molding method. The carbon fiber-reinforced composite material of the present invention is favorable for structure materials for an automobile and building materials, especially for structure materials for an automobile. Examples of the structure materials for an automobile include bumpers, spoilers, cowlings, radiator grilles, garnishes, hoods, trunk lids, fender panels, door panels, roof panels, instrument panels, door trims, quarter trims, roof linings, pillar garnishes, deck trims, tonneau boards, package trays, dashboards, console boxes, kicking plates, switch bases, sheet backboards, sheet frames, armrests, sun visors, intake manifolds, engine head covers, engine undercovers, and oil filter housings.

EXAMPLES

The present invention is described in detail with reference to Examples and Comparative Examples given below, but the present invention is not limited to the following Examples. Various evaluations and measurements of epoxy resin curing agents were carried out according to the methods mentioned below.

(Viscosity)

Using an E-type viscometer "TVE-22H Model Viscometer, cone-plate type" (manufactured by Toki Sangyo Co., Ltd.), the viscosity of epoxy resin curing agents and epoxy resin compositions was measured. Epoxy resin curing agents were measured at 25° C. and epoxy resin compositions were at 40° C. Those having a lower viscosity can be filled at a higher filling rate in molding and have better moldability.

(Gelling Time)

A rheometer "ARES-G2" (manufactured by TA Instruments Inc.) was used for evaluation. An epoxy resin composition was filled between aluminum plates heated at 80° C., and at a temperature 80° C., a frequency 1 Hz and a plate-to-plate distance 0.5 mm, the storage elastic modulus G' and the loss elastic modulus G" thereof were measured, and the intersection of G' and G" was referred to as the gelling time. A shorter gelling time means more rapid curability.

(Heat Distortion Temperature (HDT))

Between two aluminum plates coated with a release agent "Frekote 700NC" (manufactured by Henkel AG & Co.), a silicone rubber round braid of φ2 mm was sandwiched and fixed therebetween with a C-clamp to form a mold. A defoamed epoxy resin composition was cast into the mold heated at 80° C., using a needleless plastic syringe and taking about 1 minute, and cured in a hot drier at 120° C. for 120 minutes to give a cast plate having a thickness of 2 mm of a cured product of the epoxy resin composition.

The resultant cast plate was cut into a test piece having a size of 10 mm×80 mm×2 mm thick. Using an HDT tester "Auto-HDT3D-2" (manufactured by Toyo Seiki Seisakusho, Ltd.), the heat distortion temperature of the sample was measured under the condition of an inter-fulcrum distance 64 mm, a load 1.8 MPa and a heating rate 120° C./hr.

(Tensile Test)

According to the same process as above, an epoxy resin composition was cast into a mold to produce a cast plate having a thickness of 2 mm of a cured product of the epoxy resin composition. The resultant cast plate was machined to give a dumbbell-shaped test piece of JIS K7162-1A Model, and this was tested to measure the tensile strength thereof. Using a tensile tester ("Strograph AP-III" manufactured by Toyo Seiki Seisaku-sho, Ltd., load cell capacity 20 kN), a tensile test was carried out under the condition of a measurement temperature 23° C., an inter-gripper distance 115 mm, a gauge length 50 mm, and a stroke rate 1 mm/min in an elastic modulus measurement range and 5 mm/min in a strength measurement range, to measure the elastic modulus, the maximum point strength, the maximum point distortion and the break point distortion of the test piece.

(Charpy Impact Test)

According to the same process as above, a notchless test piece having a size of 10 mm×80 mm×2 mm thick of a cured product of an epoxy resin composition was prepared. Using a digital Charpy impact ester "DC-UB" (manufactured by Toyo Seiki Seisaku-sho, Ltd.), the test piece was tested according to a Charpy impact test at a temperature 23° C. and a relative humidity 50% RH to determine the Charpy impact strength thereof.

Example 1 (Preparation of Epoxy Resin Curing Agent and Epoxy Resin Composition)

10 g of bisphenol A (4,4'-(propane-2,2-diyl)diphenol, manufactured by Kanto Chemical Co., Inc.) as a phenol compound (B) was blended and mixed with 100 g of 1,3-bis(aminomethyl)cyclohexane (1,3-BAC, manufactured by Mitsubishi Gas Chemical Company, Inc., cis/trans ratio=77/23) as an amine compound (A) to prepare an epoxy resin curing agent.

Further, the epoxy resin curing agent was blended and mixed with a bisphenol A-type liquid epoxy resin ("jER825", manufactured by Mitsubishi Gas Chemical Company Inc.) as a main ingredient in such a manner that the active amine hydrogen number in the epoxy resin curing agent and the epoxy group number in the epoxy resin of the main ingredient could be in an equimolar ratio, thereby preparing an epoxy resin composition.

The resultant epoxy resin curing agent and the epoxy resin composition were evaluated according to the above-mentioned methods. The results are shown in Table 1. The epoxy resin jER825 is represented by the following structural formula, the epoxy equivalent thereof is 175 g/equivalent, and m=0.035.

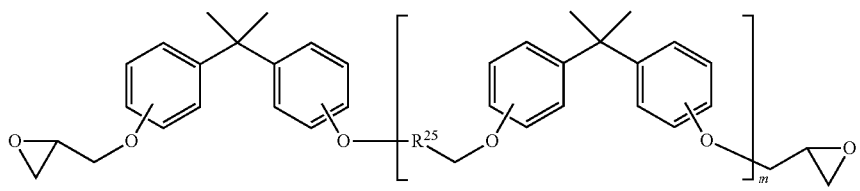

In the formula, $R^{25}$ is —$CH_2CH(OH)$—, or —$CH(OH)CH_2$—.

Examples 2 to 4

Epoxy resin curing agents and epoxy resin compositions were prepared according to the same method as in Example 1 except that the content of bisphenol A in the epoxy resin curing agent was changed as in Table 1, and evaluated according to the above-mentioned methods. The results are shown in Table 1.

Example 5

An epoxy resin curing agent and an epoxy resin composition were prepared according to the same method as in Example 3 except that a styrenated phenol ("Kumanox-3110" manufactured by Kumho Petrochemical Co., Ltd.) having a compound represented by the following structural formula as the main ingredient was used as the phenol compound (B) in place of bisphenol A, and evaluated according to the above-mentioned methods. The results are shown in Table 1.

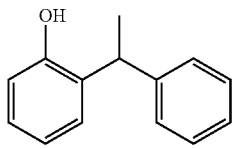

Example 6

An epoxy resin curing agent and an epoxy resin composition were prepared according to the same method as in Example 1 except that metaxylylenediamine (MXDA, manufactured by Mitsubishi Gas Chemical Company, Inc.) was used as the amine compound (A) in place of 1,3-BAC, and evaluated according to the above-mentioned methods. The results are shown in Table 1.

Example 7

An epoxy resin curing agent and an epoxy resin composition were prepared according to the same method as in Example 3 except that metaxylylenediamine (MXDA, manufactured by Mitsubishi Gas Chemical Company, Inc.) was used as the amine compound (A) in place of 1,3-BAC, and evaluated according to the above-mentioned methods. The results are shown in Table 1.

Example 8

An epoxy resin curing agent and an epoxy resin composition were prepared according to the same method as in Example 4 except that metaxylylenediamine (MXDA, manufactured by Mitsubishi Gas Chemical Company, Inc.) was used as the amine compound (A) in place of 1,3-BAC, and evaluated according to the above-mentioned methods. The results are shown in Table 1.

Example 9

80 g of 1,3-BAC was used as an amine compound (A), and 20 g of N-aminoethylpiperazine (AEP, manufactured by Tosoh Corporation) was used as an amine compound except for (A). 100 g of these compounds were blended and mixed with 20 g of bisphenol A (4,4'-(propane-2,2-diyl)diphenol, manufactured by Kanto Chemical Co., Inc.) as a phenol compound (B) to prepare an epoxy resin curing agent. Using the epoxy resin curing agent and according to the same method as in Example 1, an epoxy resin composition was prepared, and the epoxy resin curing agent and the epoxy resin composition were evaluated according to the above-mentioned methods. The results are shown in Table 1.

Example 10

An epoxy resin curing agent and an epoxy resin composition were prepared according to the same method as in Example 3 except that bisphenol E (1,1-bis(4-hydroxyphenyl)ethane, manufactured by Tokyo Chemical Industry Co., Ltd.) was used as the phenol compound (B) in place of bisphenol A, and evaluated according to the above-mentioned methods. The results are shown in Table 1.

Example 11

An epoxy resin curing agent and an epoxy resin composition were prepared according to the same method as in Example 3 except that bisphenol F (bis(4-hydroxyphenyl)methane, manufactured by Tokyo Chemical Industry Co., Ltd.) was used as the phenol compound (B) in place of bisphenol A, and evaluated according to the above-mentioned methods. The results are shown in Table 1.

Comparative Example 1

An epoxy resin composition was prepared according to the same method as in Example 1 except that the phenol compound (B) was not blended, and evaluated according to the above-mentioned methods. The results are shown in Table 1.

Comparative Examples 2 and 3

Epoxy resin compositions were prepared according to the same method as in Example 1 except that the content of bisphenol A in the epoxy resin curing agent was changed to the amount shown in Table 1, and evaluated according to the above-mentioned methods. The results are shown in Table 1.

Comparative Example 4

An epoxy resin composition was prepared according to the same method as in Example 6 except that the phenol compound (B) was not blended, and evaluated according to the above-mentioned methods. The results are shown in Table 1.

Comparative Example 5

An epoxy resin curing agent and an epoxy resin composition were prepared according to the same method as in Comparative Example 1 except that isophoronediamine (IPDA) was used as the amine compound in place of 1,3-BAC, and evaluated according to the above-mentioned methods. The results are shown in Table 1.

Comparative Example 6

An epoxy resin curing agent and an epoxy resin composition were prepared according to the same method as in Example 1 except that isophoronediamine (IPDA) was used as the amine compound in place of 1,3-BAC, and evaluated according to the above-mentioned methods. The results are shown in Table 1.

Comparative Example 7

An epoxy resin curing agent and an epoxy resin composition were prepared according to the same method as in Example 3 except that isophoronediamine (IPDA) was used as the amine compound in place of 1,3-BAC, and evaluated according to the above-mentioned methods. The results are shown in Table 1.

Comparative Example 8

An epoxy resin composition was prepared according to the same method as in Example 9 except that the phenol compound (B) was not blended, and evaluated according to the above-mentioned methods. The results are shown in Table 1.

TABLE 1

| | Curing Agent | | | | | | Evaluation Results (composition) |
|---|---|---|---|---|---|---|---|
| | Amine Compound | | | | | | |
| | Amine Compound (A) (part by mass) | Amine Compound except for amine compound (A) (part by mass) | Phenol Compound Kind | Content (part by mass)* | Viscosity of Curing Agent (mPa·s) at 25° C. | Main Ingredient Epoxy Resin Kind | Viscosity of Composition (mPa·s) at 40° C. |
| Example 1 | 1,3-BAC(100) | — | Bisphenol A | 10 | 17 | jER825 | 200 |
| Example 2 | 1,3-BAC(100) | — | Bisphenol A | 15 | 27 | jER825 | 230 |
| Example 3 | 1,3-BAC(100) | — | Bisphenol A | 20 | 42 | jER825 | 270 |
| Example 4 | 1,3-BAC(100) | — | Bisphenol A | 30 | 106 | jER825 | 380 |
| Example 5 | 1,3-BAC(100) | — | Styrenated Phenol | 20 | 15 | jER825 | 180 |
| Example 6 | MXDA(100) | — | Bisphenol A | 10 | 13 | jER825 | 190 |
| Example 7 | MXDA(100) | — | Bisphenol A | 20 | 26 | jER825 | 250 |
| Example 8 | MXDA(100) | — | Bisphenol A | 30 | 56 | jER825 | 340 |
| Example 9 | 1,3-BAC(80) | AEP(20) | Bisphenol A | 20 | 50 | jER825 | 290 |
| Example 10 | 1,3-BAC(100) | — | Bisphenol E | 20 | 39 | jER825 | 180 |
| Example 11 | 1,3-BAC(100) | — | Bisphenol F | 20 | 42 | jER825 | 250 |
| Comparative Example 1 | 1,3-BAC(100) | — | — | 0 | 8 | jER825 | 150 |
| Comparative Example 2 | 1,3-BAC(100) | — | Bisphenol A | 5 | 11 | jER825 | 170 |
| Comparative Example 3 | 1,3-BAC(100) | — | Bisphenol A | 40 | 320 | jER825 | 550 |
| Comparative Example 4 | MXDA(100) | — | — | 0 | 7 | jER825 | 140 |
| Comparative Example 5 | — | IPDA(100) | — | 0 | 18 | jER825 | 210 |
| Comparative Example 6 | — | IPDA(100) | Bisphenol A | 10 | 56 | jER825 | 310 |
| Comparative Example 7 | — | IPDA(100) | Bisphenol A | 20 | 245 | jER825 | 500 |
| Comparative Example 8 | 1,3-BAC(80) | AEP(20) | — | 0 | 9 | jER825 | 160 |

TABLE 1-continued

| | Evaluation Results (composition) | Evaluation Results (cured product after curing at 120° C. × 120 min) | | | | | |
|---|---|---|---|---|---|---|---|
| | Gelling Time (min) at 80° C. | HDT (° C.) | Elastic Modulus (GPa) | Maximum Point Strength (MPa) | Maximum Point Distortion (%) | Breaking Point Distortion (%) | Charpy Impact (Strength notchless, kJ/m$^2$) |
| Example 1 | 7.5 | 127 | 2.6 | 71 | 5.1 | 5.4 | 15 |
| Example 2 | 6.5 | 125 | 2.5 | 74 | 5.3 | 5.6 | 15 |
| Example 3 | 6.0 | 125 | 2.6 | 74 | 5.2 | 5.2 | 16 |
| Example 4 | 4.5 | 119 | 2.5 | 74 | 4.9 | 5.1 | 16 |
| Example 5 | 8.0 | 124 | 2.6 | 74 | 5.3 | 5.3 | 16 |
| Example 6 | 9.5 | 109 | 2.6 | 74 | 5.5 | 5.6 | 18 |
| Example 7 | 7.5 | 108 | 2.6 | 75 | 5.6 | 5.6 | 19 |
| Example 8 | 5.5 | 103 | 2.6 | 75 | 5.6 | 5.6 | 19 |
| Example 9 | 6.0 | 124 | 2.6 | 76 | 6.1 | 6.2 | 20 |
| Example 10 | 5.5 | 125 | 2.6 | 74 | 5.5 | 5.5 | 17 |
| Example 11 | 5.5 | 125 | 2.6 | 74 | 5.4 | 5.4 | 16 |
| Comparative Example 1 | 11.5 | 131 | 1.9 | 73 | 5.4 | 5.5 | 12 |
| Comparative Example 2 | 9.5 | 129 | 2.6 | 66 | 4.7 | 4.9 | 15 |
| Comparative Example 3 | 3.5 | 112 | 2.4 | 68 | 5.7 | 6.4 | 17 |
| Comparative Example 4 | 14.0 | 111 | 1.9 | 74 | 5.6 | 5.6 | 15 |
| Comparative Example 5 | 33.0 | 139 | 2.3 | 80 | 5.3 | 5.5 | 14 |
| Comparative Example 6 | 20.0 | 137 | 2.8 | 82 | 5.4 | 5.5 | 16 |
| Comparative Example 7 | 15.0 | 136 | 2.8 | 82 | 5.5 | 5.5 | 16 |
| Comparative Example 8 | 11.5 | 129 | 2.0 | 74 | 6.1 | 6.1 | 16 |

*Content (part by mass) relative to 100 parts by mass of the amine compound.

From Table 1, it is known that the epoxy resin curing agents and the epoxy resin compositions of the present invention have a low viscosity and are rapidly curable. Consequently, these are favorable for producing various types of molded articles using various molding methods such as a high-cycle RTM method. In addition, as shown in Examples 1 to 4, it is known that the cured products of the epoxy resin compositions of the present invention maintain the mechanical properties on the same level as that in Comparative Example 1 using the epoxy resin curing agent not containing the phenol compound (B) and the tensile elastic modulus and the Charpy impact strength of the former tend to be higher than those in Comparative Example 1.

(Production and Mold Releasability Evaluation of CFRP)

The epoxy resin compositions of Examples 1 to 4, Examples 9 to 11 and Comparative Examples 1 and 5 were individually infiltrated into carbon fiber fabrics ("C06343" manufactured by Toray Industries, Inc., T300 plain-woven cloth, 3K, 198 g/m$^2$, 0.25 mm thick, 4-ply) according to a hand lay-up molding method at room temperature to produce CFRP substrates. Subsequently, the CFRP substrate was set in aluminum split molds previously heated at 120° C. in an oven, and then rapidly the molds were closed, and the curing behavior and the mold releasability after the lapse of a predetermined period of time were evaluated.

The time taken until the CFRP substrate completely cured and became releasable from the mold is shown in Table 2. A value of shorter period of time means that the composition can cure to be releasable from a mold within a short period of time and the CFRP productivity is excellent.

TABLE 2

| | Curing Agent | | | | Main Ingredient | Evaluation Result |
|---|---|---|---|---|---|---|
| | Amine Compound | | Phenol Compound | | | |
| | Amine Compound (A) (part by mass) | Amine Compound except for amine compound (A) (part by mass) | Kind | Content (part by mass)* | Epoxy Resin Kind | Mold Release Time (min) |
| Example 1 | 1,3-BAC(100) | — | Bisphenol A | 10 | jER825 | 5 |
| Example 2 | 1,3-BAC(100) | — | Bisphenol A | 15 | jER825 | 4 |
| Example 3 | 1,3-BAC(100) | — | Bisphenol A | 20 | jER825 | 3 |
| Example 4 | 1,3-BAC(100) | — | Bisphenol A | 30 | jER825 | 3 |
| Example 9 | 1,3-BAC(80) | AEP(20) | Bisphenol A | 20 | jER825 | 3 |

TABLE 2-continued

| | Curing Agent | | | | | |
| | Amine Compound | | | | Main Ingredient | Evaluation Result |
| | Amine Compound (A) (part by mass) | Amine Compound except for amine compound (A) (part by mass) | Phenol Compound Kind | Content (part by mass)* | Epoxy Resin Kind | Mold Release Time (min) |
|---|---|---|---|---|---|---|
| Example 10 | 1,3-BAC(100) | — | Bisphenol E | 20 | jER825 | 3 |
| Example 11 | 1,3-BAC(100) | — | Bisphenol F | 20 | jER825 | 3 |
| Comparative Example 1 | 1,3-BAC(100) | — | — | 0 | jER825 | 8 |
| Comparative Example 5 | — | IPDA(100) | — | 0 | jER825 | 30 |

*Content (part by mass) relative to 100 parts by mass of the amine compound.

From Table 2, it is known that the epoxy resin curing agent and the epoxy resin composition using it of Examples of the present invention are rapidly curable when applied to use for CFRP and the time to be taken until release from mold is short, and are therefore excellent in CFRP productivity.

INDUSTRIAL APPLICABILITY

According to the present invention, there can be provided an epoxy resin curing agent and an epoxy resin composition that are rapidly curable and have a low viscosity, which therefore can produce CFRP such as structure materials for an automobile and building materials according to a high-cycle RTM method at good productivity. When the epoxy resin composition is used as a matrix resin for CFRP, the composition is excellent in infiltrability into carbon fibers and is rapidly curable, and therefore the time to be taken until release from mold can be shortened and CFRP productivity can be thereby improved.

The invention claimed is:

1. An epoxy resin curing agent comprising an amine compound (A) represented by the following formula (1) and a phenol compound (B), wherein the content of the component (B) is from 8 to 35 parts by mass relative to 100 parts by mass of the component (A):

$$R^1HN-H_2C-A-CH_2-NHR^2 \quad (1)$$

wherein $R^1$ and $R^2$ each independently represents a hydrogen atom or an aminoalkyl group having 1 to 6 carbon atoms, and A represents a cyclohexylene group or a phenylene group, wherein the total content of the amine compound (A) and the phenol compound (B) is from 80% by mass to 100% by mass, relative to the total amount of the epoxy resin curing agent.

2. The epoxy resin curing agent according to claim 1, wherein $R^1$ and $R^2$ in the formula (1) are both hydrogen atoms.

3. The epoxy resin curing agent according to claim 1, wherein A in the formula (1) is a cyclohexylene group.

4. The epoxy resin curing agent according to claim 1, wherein the phenol compound (B) is a compound represented by the following formula (2):

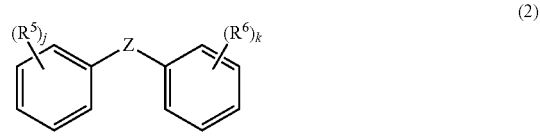

wherein $R^5$ and $R^6$ each independently represents an OH group or an alkyl group having 1 to 4 carbon atoms; j and k each independently represents an integer of 0 to 5, provided that j+k is 1 or more; plural $R^5$'s, if any, may be all the same as or different from each other, plural $R^6$'s, if any, may be all the same as or different from each other, provided that at least one OH group is present as $R^5$ or $R^6$; and Z represents a single bond, an alkylene group having 1 to 6 carbon atoms, an alkylidene group having 2 to 6 carbon atoms, a cycloalkylene group having 5 to 10 carbon atoms, a cycloalkylidene group having 5 to 10 carbon atoms, an arylalkylene group having 7 to 15 carbon atoms, an arylalkylidene group having 7 to 15 carbon atoms, —S—, —SO—, —SO$_2$—, —O—, —CO—, —C(CF$_3$)$_2$—, —CH(CF$_3$)—, —CF$_2$—, —CONH—, or —COO—.

5. The epoxy resin curing agent according to claim 4, wherein the phenol compound (B) is at least one selected from the group consisting of 4,4'-(propane-2,2-diyl)diphenol, bis(4-hydroxyphenyl)methane, 1,1-bis(4-hydroxyphenyl)ethane, and styrenated phenol.

6. An epoxy resin composition comprising the epoxy resin curing agent of claim 1, and an epoxy resin.

7. The epoxy resin composition according to claim 6, wherein the epoxy resin is an epoxy resin containing an aromatic ring or an alicyclic structure in the molecule.

8. The epoxy resin composition according to claim 7, wherein the epoxy resin is an epoxy resin represented by the following formula (3):

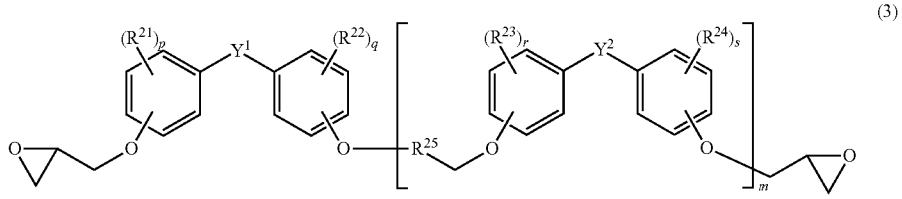

(3)

wherein $R^{21}$ to $R^{24}$ each independently represents an alkyl group having 1 to 6 carbon atoms; p, q, r and s each independently represents an integer of 0 to 4, with respect to each of $R^{21}$, $R^{22}$, $R^{23}$, and $R^{24}$, plural groups, if any, may be all the same as or different from each other; $Y^1$ and $Y^2$ each independently represents a single bond, —$CH_2$—, —$CH(CH_3)$—, or —$C(CH_3)_2$—; $R^{25}$ represents —$CH_2CH(OH)$—, or —$CH(OH)CH_2$—; and m represents a mean repeating unit number and is a number of 0 to 0.2.

9. The epoxy resin composition according to claim 6, which has a viscosity at a temperature 40° C. of 400 mPa·s or less.

10. The epoxy resin composition according to claim 6, which is for a carbon fiber-reinforced composite material.

11. A carbon fiber-reinforced composite material comprising a cured product of the epoxy resin composition of claim 6, and carbon fibers.

12. The carbon fiber-reinforced composite material according to claim 11, which is a structure material for an automobile.

13. A method for producing the carbon fiber-reinforced composite material of claim 11, comprising performing molding according to a low-pressure RTM method, a middle-pressure RTM method, a high-pressure RTM method, a compression RTM method, a liquid compression molding method, a liquid lay-down molding method, a spray lay-down molding method, a surface RTM method, a prepreg compression molding method, or a liquid cast molding method.

14. An epoxy resin curing agent comprising an amine compound (A) represented by the following formula (1) and a phenol compound (B), wherein the content of the component (B) is from 8 to 35 parts by mass relative to 100 parts by mass of the component (A):

wherein $R^1$ and $R^2$ each independently represent a hydrogen atom, or an aminoalkyl group having 1 to 6 carbon atoms, and A represents a cyclohexylene group.

15. An epoxy resin composition comprising the epoxy resin curing agent of claim 14, and an epoxy resin.

16. A carbon fiber-reinforced composite material comprising a cured product of the epoxy resin composition of claim 15, and carbon fibers.

\* \* \* \* \*